United States Patent
Naider-Fanfan

(10) Patent No.: US 12,473,218 B2
(45) Date of Patent: Nov. 18, 2025

(54) DRIED MICROBIAL SLUDGE GRANULE AS ADDITIVE FOR WASTEWATER TREATMENT

(71) Applicant: PROBIOSPHERE INC., Rivière-du-Loup (CA)

(72) Inventor: Pierre Naider-Fanfan, Rivière-du-Loup (CA)

(73) Assignee: PROBIOSPHERE INC., Rivière-du-Loup (CA)

( * ) Notice: Subject to any disclaimer, the term of this patent is extended or adjusted under 35 U.S.C. 154(b) by 447 days.

(21) Appl. No.: 16/484,219

(22) PCT Filed: Feb. 7, 2018

(86) PCT No.: PCT/CA2018/050136
§ 371 (c)(1),
(2) Date: Aug. 7, 2019

(87) PCT Pub. No.: WO2018/145202
PCT Pub. Date: Aug. 16, 2018

(65) Prior Publication Data
US 2020/0031698 A1    Jan. 30, 2020

Related U.S. Application Data

(60) Provisional application No. 62/456,315, filed on Feb. 8, 2017.

(30) Foreign Application Priority Data

Feb. 8, 2017  (CA) ................................ CA 2957375

(51) Int. Cl.
*C02F 3/34*    (2023.01)
*C02F 3/10*    (2023.01)
(Continued)

(52) U.S. Cl.
CPC ................ *C02F 3/341* (2013.01); *C02F 3/10* (2013.01); *C02F 3/2806* (2013.01); *C02F 3/348* (2013.01); *C12N 1/20* (2013.01)

(58) Field of Classification Search
CPC .... C02F 3/02; C02F 3/10; C02F 3/107; C02F 3/2806; C02F 3/34; C02F 3/341;
(Continued)

(56) References Cited

U.S. PATENT DOCUMENTS 6,793,822 B2    9/2004   Tay et al.

FOREIGN PATENT DOCUMENTS

| CN | 106277326 A | 1/2017 |
| CN | 106517503 A | 3/2017 |
| WO | 2011/106848 A1 | 9/2011 |

OTHER PUBLICATIONS

Liu, et al., "Characterization of microbial community in granular sludge treating brewery wastewater," Water Research, 36:1767-1775. (Year: 2002).*

(Continued)

*Primary Examiner* — Patrick Orme
(74) *Attorney, Agent, or Firm* — pH IP Law

(57) ABSTRACT

The present invention provides compositions as additives for wastewater treatment. A first composition comprising *archaea* microorganism granules for bioaugmentation for treatment of COD in wastewater, and a second composition of activated silicate beads that allow removal of phosphate, nitrogen and suspended solids. The mixture of both compositions act synergistically by promoting organic matter degradation and allowing the removal of phosphate without consuming alkalinity of the treated solution.

8 Claims, 5 Drawing Sheets

(51) Int. Cl.
   *C02F 3/28* (2023.01)
   *C12N 1/20* (2006.01)
(58) Field of Classification Search
   CPC .. C02F 3/348; C02F 1/02; C02F 1/281; C02F 11/04; Y02W 10/10; C12N 1/20
   See application file for complete search history.

(56) References Cited

OTHER PUBLICATIONS

Fang, et al., "Microstructural Analysis of UASB Granules Treating Brewery Wastewater," Water Sci. and Tech., 31:9:129-135. (Year: 1995).*

Montenegro, et al., "Microbial Community Evaluation of Anaerobic Granular Sludge From a Hybrid Reactor Treating Pentachlorophenol by Using Fluorescence in situ Hybridization," Water Sci. and Tech., 48:6:65-73. (Year: 2003).*

O'Reilly, et al., "Cultivation of low-temperature 15 C, anaerobic, wastewater treatment granules," Letters in Applied Microbiology, 49:421-426. (Year: 2009).*

Lv, et al., "Drying and Re-cultivation of Aerobic Granules," Bioresource Tech., 129:700-703. (Year: 2013).*

Agrawal, et al., "Utilization of Dried Pelletized Anaerobic Sludge for Anaerobic Treatment of Wastewater," J. of Fermentation and Bioengineering, 83:1:91-95. (Year: 1997).*

Chojnacka, et al., "Noteworthy Facts about a Methane-Producing Microbial Community Processing Acidic Effluent from Sugar Beet Molasses Fermentation," PLoS One, 10:1371 (Year: 2015).*

Agrawal, L.K. et al., "Utilization of Dried Pelletized Anaerobic Sludge for Anaerobic Treatment of Wastewater", Journal of Fermentation and Bioengineering, vol. 83(1): 91-95 (1997).

Gonzalez-Gil, G. et al., "Cluster Structure of Anaerobic Aggregates of an Expanded Granular Sludge Bed Reactor", Applied and Environmental Microbiology, vol. 67(8); 3683-3692 (2001).

Gunnigle, E. et al., "Low-temperature anaerobic digestion is associated with differential methanogenic protein expression", FEMS Microbiology Letters, vol. 362(10): 1-7 (2015).

Lv, Y. et al., "Drying and re-cultivation of aerobic granules", Bioresource Technology, vol. 129: 700-703 (2013).

Montenegro M.A.P. et al., "Microbial community evaluation of anaerobic granular sludge from a hybrid reactor treating pentachlorophenol by using fluorescence in situ hybridization", Water Science and Technology, vol. 48(6): 65-73 (2003).

Noppeney, R., "Nereda: The green revolution in wastewater treatment", Connect Magazine, p. 4-5 (2014).

O'Reilly, J. et al., "Cultivation of low-temperature (15 °C), anaerobic, wastewater treatment granules", Letters in Applied Microbiology, vol. 49: 421-426 (2009).

Otten A., "Nereda, a Proven Technology: Worldwide Nereda Variants and Applications", Royal Haskoning DHV (2015).

Pishgar, R. et al., "Augmenting Lagoon Process Using Reactivated Freeze-dried Biogranules", Applied Biochemistry Biotechnology, vol. 183: 137-154 (2017).

Pronk, M. et al., "Full scale performance of the aerobic granular sludge process for sewage treatment", Water Research, vol. 84: 207-217 (2015).

Robertson, S. et al., "Achieving cost-effective and sustainable wastewater treatment using Nereda®", Civil Engineering Magazine, p. 56-59 (2015).

Robertson, S. et al., "Achieving sustainable wastewater treatment through innovation: an update on the Nereda technology", Water21, p. 39-41(2015).

Fang et al., "Microstructural analysis of UASB Granules treating Brewery Wastewater", Wat. Sci. Tech., 31:9 129-135, 1995. XP055770440.

Liu W-T et al., "Characterization of microbial community in granular sludge treating brewery wastewater", Water Research, Elsevier, Amsterdam, NL, 36:7, 1767-1775, XP027298151, 2002. ISSN: 0043-1354.

Office Action issued in European Patent Application No. 18750903.9 mailed Feb. 11, 2021.

Liu et al., "Analysis of bacterial, fungal and archaeal populations from a municipal wastewater treatment plant developing an innovative aerobic granular sludge process," *World J Microbiol Biotechnol,* 33:14 (2016).

Massalha et al., "The effect of anaerobic biomass drying and exposure to air on their recovery and evolution", *Water Research,* vol. 63, pp. 42-51 (2014).

Massalha et al., "Application of immobilized and granular dried anaerobic biomass for stabilizing and increasing anaerobic biosystems tolerance for high organic loads and phenol shocks", Bioresource Technology, Elsevier, Amsterdam, NL, vol. 197, pp. 106-112 (2015).

Office Communication issued in European Patent Application No. 18 750 903.9, dated Jan. 26, 2023.

Pronk et al., "Effect and behaviour of different substrates in relation to the formation of aerobic granular sludge", *Applied Microbiology and Biotechnology;* vol. 99, pp. 5257-5268 (2015).

Sun et al., "Eubacteria and Archaea community of simultaneous methanogenesis and denitrification granular sludge", *Journal of Environmental Science 20,* 626-631 (2008).

Winkler et al., "Evaluating the solid retention time of bacteria in flocculent and granular sludge", *Water Research* 46; pp. 4973-4980 (2012).

Pikuta, E. V. et al., "*Thermococcus thioreducens* sp. nov., a novel hyperthermophilic, obligately sulfur-reducing archaeon from a deep-sea hydrothermal vent," *International Journal of Systematic and Evolutionary Microbiology,* 57 (2007): 1612-1618.

Woese, C. R. et al., "Towards a natural system of organisms: Proposal for the domains Archaea, Bacteria, and Eucarya," *Proc. Natl. Acad. Sci.,* 87 (1990): 4576-4579.

\* cited by examiner

DRIED MICROBIAL SLUDGE GRANULE AS ADDITIVE FOR WASTEWATER TREATMENT

This application is a national phase application under 35 U.S.C. § 371 of International Application No. PCT/CA2018/050136, filed Feb. 7, 2018, which claims priority to U.S. Provisional Application No. 62/456,315, and Canadian Application No. 2957375, both filed Feb. 8, 2017. The entire text of each of the above referenced disclosures is specifically incorporated herein by reference.

FIELD OF THE INVENTION

This invention relates to the field of additive for wastewater treatment by bioaugmentation that allows removal of phosphate, and suspended solids while promoting organic matter degradation without consuming alkalinity.

BACKGROUND OF THE INVENTION

Wastewater treatment in the treatment of wastewaters by oxidative biological purification in aerobic granular sludge blanket (AGSB) reactors, wastewater flows in an upward direction through an oxidation chamber in which micro-organisms are present. Movement of the suspension of wastewater and micro-organisms within the wastewater chamber is provided by the introduction of an oxygen-containing gas which also serves to mix the suspension of biological material and wastewater. Within the reactors are inner zones of regulated settling which cooperate in the removal or accumulation of granules of a specified size range.

One problem with oxidative wastewater treatment in reactors of this type is the lack of cohesion between the unsupported biomass thus making the handling of the biomass generally difficult. In particular, removing the biomass from the treated wastewater and producing biomass which is suitably robust to be used as a seed for other reactors, has proven to be difficult.

In recent years, aerobic granular sludge, such as disclosed in U.S. Pat. No. 6,793,822 or WO2011/106848, has become a promising technology for wastewater treatment. The granular sludge is used as an inoculant to seed bioreactors to facilitate and/or speed up the separation of the sludge from the treated liquid.

It is recognized that the use of such granules has the potential to improve the purification efficiency of reactors, thus allowing the use of smaller reactor systems. If the biomass of aerobic granules can also be produced to a commercially acceptable level, it is expected that the use will reduce suspension and mixing energy requirements and give rise to less erosion of equipment.

The Nereda® Technology[1] has been deemed one of the most innovative process for producing such aerobic granules. However, inconveniences of this technology come from the fact that the in-situ formation of the granules can be long to start. The process involves multiple repetitive steps and depending on the characteristics of the influent wastewater, it can take as long as 4 months to start-up properly.

The present invention hereby provides alternative reagents for wastewater treatment.

SUMMARY OF THE INVENTION

The present invention provides compositions as additives for wastewater treatment: a first composition comprising *archaea* microorganism granules for bioaugmentation for treatment of COD in wastewater, and a second composition of activated silicate beads that allow removal of phosphate, nitrogen and suspended solids.

In accordance with a particular aspect, the mixture of both compositions act synergistically by promoting organic matter degradation and allowing the removal of phosphate without consuming alkalinity of the treated solution.

This invention provides two main components for wastewater treatment, each component being capable of being used alone, or in mixed combination for greater effectiveness and better stability of the system. One such component is conditioned dried granules comprising anaerobic bacteria (called anaerobic granules); the other being silica beads (zeolite) activated with $Fe^{3+}$ and $Al^{3+}$.

In a first aspect of the invention, there is provided a composition comprising at least about 30% *archaea* microorganisms in a granular form. In a second aspect of the invention, there is provided use of the granular microorganism composition defined herein, as an inoculant for wastewater treatment.

In a further aspect, the present invention provides a composition for wastewater treatment comprising silica beads activated with $Fe^{3+}$ and $Al^{3+}$. In a further aspect, the present invention provides a use of the activated silica composition as defined herein, as an inoculant for wastewater treatment.

According to a further aspect of the invention, there is provided a reagent mixture for wastewater treatment comprising dried granules comprising a consortium of anaerobic and/or aerobic microorganism, in admixture with the activated silica bead composition defined herein. According to a further aspect, the invention provides use of the reagent mixture defined herein, as an inoculant for wastewater treatment.

In a further aspect of the invention, there is provided a method for treating wastewater comprising the steps of: contacting the composition as defined herein with wastewater to be treated to form a wastewater: granules mixture; incubating the mixture for a period of time sufficient to decrease a COD of the wastewater to at least about 50%; and separating said granules from treated wastewater.

In a further aspect of the invention, there is provided a method for treating wastewater comprising the steps of: contacting the composition as defined herein with wastewater to be treated to form a wastewater: beads mixture; incubating the mixture for a period sufficient to decrease a COD of the wastewater to at least about 50%; separating said beads from treated wastewater.

According to a further aspect of the invention, there is provided a method for treating wastewater comprising the steps of: contacting the reagent as defined herein with wastewater to be treated to form a wastewater: reagent mixture; incubating the mixture for a period of time sufficient to decrease a COD of the wastewater to at least about 50%; and separating said reagent from treated wastewater.

In accordance with a further aspect, the invention provides a process for making activated silica beads comprising the steps of: mixing dry zeolite with $FeCl_3$; and slowly adding dry powder of $NaAlO_2$.

DETAILED DESCRIPTION OF THE INVENTION

ABBREVIATIONS AND DEFINITIONS

Abbreviations

Figure 1A:
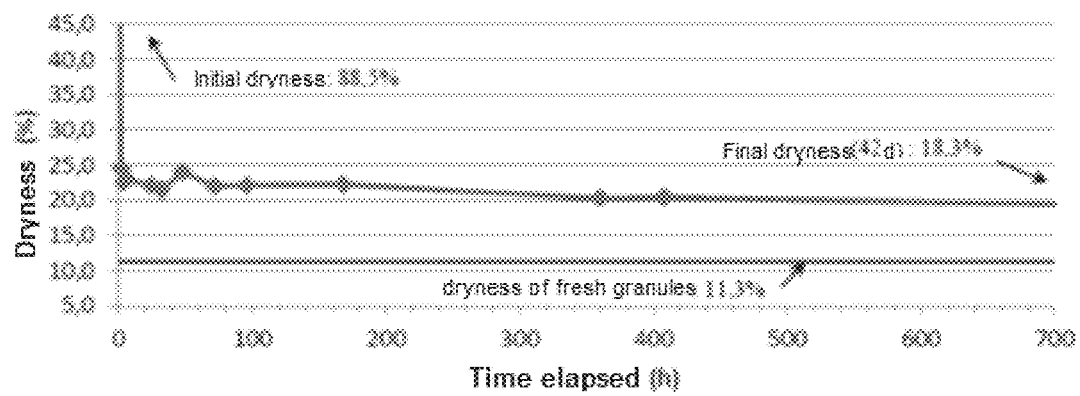
FIG. 1A shows the kinetic of rehydration of the granules in demineralized water at ambient temperature.

COD: chemical oxygen demand; MLSS: mixed liquor suspended solids; MLVSS: mixed liquor volatiles suspended solids; SV30: suspended volume as 30 minutes; SVI: sludge volume index.

AGSB (Aerobic Granular Sludge Blanket), AMBR (Anaerobic Membrane Bio Reactor), EGSB (Expanded Granular Sludge Bed), MBR (Membrane Bio Reactor), MMBR (Moving Bed Bio Reactor), SBR (Sequential Batch Reactor), UASB (Upflow Anaerobic Sludge Blanket).

Definitions

As used herein the singular forms "a", "and", and "the" include plural referents unless the context clearly dictates otherwise. Thus, for example, reference to "a cell" includes a plurality of such cells and reference to "the culture" includes reference to one or more cultures and equivalents thereof known to those skilled in the art, and so forth. All technical and scientific terms used herein have the same meaning as commonly understood to one of ordinary skill in the art to which this invention belongs unless clearly indicated otherwise.

The terms "about" or "around" as used herein refers to a margin of + or −10% of the number indicated. For sake of precision, the term about when used in conjunction with, for example: 90% means 90%+/−9% i.e. from 81% to 99%. More precisely, the term about refer to + or −5% of the number indicated, where for example: 90% means 90%+/−4.5% i.e. from 86.5% to 94.5%. When used in the context of a pH, the term "about" means+/−0.5 pH unit.

The term "up to" as used herein refers to a margin of greater than 0 but no more than about the number indicated.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

In this specification, the term "methanization" is used loosely such that methane production can also be interpreted as wastewater treatment in the absence of oxygen. Every wastewater treatment process where there is organic matter degradation results in the production of biogas. $CO_2$ and $CH_4$ mainly, along with fewer other nitrogen related gas such as $N_2$. In the absence of oxygen $CH_4$ is the main component of the biogas. In the presence of oxygen, $CO_2$ is the most abundant gas.

DETAILED DESCRIPTION OF PARTICULAR ASPECTS OF THE INVENTION

One aspect of this invention provides two main components for wastewater treatment, each component being capable of being used alone, or in mixed combination for greater effectiveness and better stability of the system. A first component comprises conditioned dried granules consisting essentially of a consortium of anaerobic bacteria (called anaerobic granules) in agglomerated form. The second component comprises silica beads (zeolite) activated with $Fe^{3+}$ and $Al^{3+}$.

Microbial Granules

In accordance with a first embodiment of the invention, there is provided a composition comprising microbial granules for inoculating a bioreactor. Particularly, the microbial granules are initially isolated from bioreactor sludge, and then fully characterized. These granules were later reproduced under controlled conditions to provide a consistent composition, in sufficient quantity for commercial use. According to a particular embodiment, the microbial granules comprise a consortium of communities from aerobic and/or anaerobic bacteria. More particularly, the consortium of bacterial communities comprises a mixture of anaerobic and facultative anaerobic bacteria. Still, most particularly, those microorganisms may be selected from Table 1 below.

In accordance with a particular embodiment, the microbial granules comprise at least about 25% *archaea* microorganisms, more particularly the granules comprise at least about 26%, 27%, 28%, 29%, 30%, 31%, 32%, 33%, 34%, 35% or 36% of *archaea* microorganisms. More particularly, the *archae* microorganisms may comprise *Crenarchaeota* and/or *Euryarchaeota* microorganisms.

In accordance with a particular embodiment, the microbial granules are dried from fresh bioreactor's microbial granular sludge, and thus present themselves in dry form. Particularly, the granules have less than about 25% humidity, more particularly less than about 20% humidity, most particularly less than about 15%, 12% or 10% humidity. This dried granular form allows much easier handling of large amounts of inoculant in much lower volumes i.e. lower energy costs of transportation and easier manipulation.

After drying, the microbial granules are then crushed and sieved to the desired particle diameter size, between about 100 microns to about 5 mm, more particularly between about 200 microns and about 4 mm, still more particularly between about 300 microns and about 3 mm.

In accordance with an alternative embodiment, the invention provides the use of the composition as defined herein, as an inoculant for wastewater treatment bioreactors.

This invention relates to the application of anaerobic granules, conditioned and dried to be applied in anaerobic as well as in aerobic technologies. These dried anaerobic granules offer the same performance as technologies using in situ formation of aerobic granules without the disadvantages of liquid inoculants, such as high volumes, low reproducibility and long lag times. These performances include:

- excellent settling properties;
- low energy consumption;
- high biomass concentration;
- low investment and operational costs;
- simultaneous biological N- and P-removal;
- simple one-tank concept (no clarifiers);
- reduced footprint;

simple and easy operation; and
pure biomass, no support media required.

Moreover, dried anaerobic granules provided by this invention applied in aerobic technologies offer the following advantages compare to the prior art Technology:
  can be applied to any existing systems, aerobic as well as anaerobic;
  speed up the slow in situ granule formation process during initial start-up;
  assures performance regardless the challenging and varying wastewater characteristics; and
  requires no need for optimization of operational strategies.

The use/application of dried granules of the present invention can be extended to any bioreactor technologies such as MBR (Membrane Bio Reactor), AMBR (Anaerobic Membrane Bio Reactor), MMBR (Moving Bed Bio Reactor), SBR (Sequential Batch Reactor), AGSB (Aerobic Granular Sludge Blanket), UASB (Upflow Anaerobic Sludge Blanket) EGSB (Expanded Granular Sludge Bed) or any type of reactor for wastewater treatment.

Activated Silica Beads

In accordance with a further embodiment of the invention, there is provided a composition for wastewater treatment comprising silica beads activated with $Fe^{3+}$ and $Al^{3+}$. Particularly, the beads are made of any type of natural zeolite, such as for example, clinoptilolite. More particularly, when producing the activated beads, the ratio $Al^{+3}$ over $Fe^{+3}$ is about 1 to 2, particularly about 1.5, and more particularly 1.5, whereas the zeolite quantity is about 0.2, particularly 0.22 and more particularly 0.224×(Fe+Al).

In accordance with a particular embodiment, the beads have a size around 10 to 60 mesh, more particularly around 14 to 50 mesh, most particularly around 40 mesh.

In accordance with an alternative embodiment, the invention provides the use of the silica beads activated with $Fe^{3+}$ and $Al^{3+}$ as a reagent for wastewater treatment.

Reagent Mixture

In accordance with a further embodiment, the invention provides a reagent mixture comprising the microbial granules as defined herein in admixture with the activated silica beads as defined herein. Particularly, the percentage of each component depends on the intended application.

For example, for aerobic and anaerobic reactors, the reagent can be 100% dried microbial granules, or the reagent can be a mixture in a ratio where the microbial granules are present from 99% to 1% compared to the silica beads. Particularly, the ratio granules/beads can be about 90%/10%, more particularly about 75%/25%, or most particularly, about 50%/50%.

The mixing of the granules and beads may be achieved prior to inoculation and premixed in bags or containers ready-to-use. Alternatively, each component may be prepared in separate containers or bags and added to the bioreactor (in the desired ratio) simultaneously or sequentially for wastewater treatment.

For application in septic tanks or other types of wastewater treatment the ratio of components in the reagent mixture can vary anywhere between from 1:99 to 99:1, particularly about 50% granules and about 50% activated silica.

In accordance with a further embodiment, the present invention provides the use of the reagent mixture as defined herein, as an inoculant for wastewater treatment.

Method for Treating Wastewater

In accordance with a particular embodiment of the invention, there is provided a method for treating wastewater comprising the steps of: a) contacting the composition of microbial granules as defined herein with wastewater to be treated to form a wastewater: granules mixture; b) incubating the mixture for a period of time sufficient to decrease a COD of the wastewater to at least about 50%; and c) separating treated wastewater from said granules.

In accordance with a particular embodiment, the present invention provides a method for treating wastewater comprising the steps of: a) contacting the composition of activated beads as defined herein with wastewater to be treated to form a wastewater: beads mixture; b) incubating the mixture for a period of time sufficient to decrease a COD of the wastewater to at least about 50%; and c) separating treated wastewater. from said beads Particularly, as will be recognized by a person skilled in the art, the activated beads may be used for coagulation and flocculation of suspended matter. Alternatively, other materials can also be added such as other microbial granules or other coagulating material.

Accordance to a further embodiment, the invention provides a method for treating wastewater comprising the steps of: a) contacting the reagent mixture as defined herein with wastewater to be treated to form a wastewater: reagent mixture; b) incubating the mixture for a period sufficient to decrease a COD of the wastewater to at least about 50%; and c) separating treated wastewater from said reagent.

In accordance with a particular embodiment, the processes as defined above may be carried out wherein the composition or reagent is added to the wastewater at a ratio of VSS substrate to inoculum of between about 0.8 to 1.2, particularly at about 1.

According to an alternative embodiment, any one of the process of the invention is aerobic, then the incubating of step b) is carried out by introducing an oxygen containing-gas with or without mixing. Alternatively, when the process is anaerobic, then the incubating of step b) is carried out without the introduction of an oxygen containing-gas, with or without mixing.

Particularly, in accordance with a particular embodiment of the process, the separating step c) may be carried out by decantation or sedimentation.

According to a further embodiment, the process may be carried out in continuous batch or by sequential batch.

In accordance with a particular embodiment, step b) of the process is carried out until COD is reduced by at least about 60%, more particularly until COD is reduced by at least about 70%.

In accordance with a particular embodiment, the process is carried out at a temperature from about 10 to about 50° C., more particularly from about 12° C. to about 40° C.

In accordance with a further embodiment, the reagent mixture may comprise a ratio of granules to beads ranging from 1:99 to 99:1. Particularly, the ratio granules:beads can be from about 90:10 to about 10:90, more particularly from about 75:25 to about 25:75, or most particularly about 50:50.

Process for Producing Activated Silica Beads

Accordance to a further embodiment of the invention, there is provided a process for making activated silica beads comprising the steps of: a) mixing dry zeolite with $FeCl_3$; and b) slowly adding dry powder of $NaAlO_2$. In particular, the $NaAlO_2$ is added at a ratio of 1.5 $FeCl_3$; and the zeolite is added in a quantity of about 0.2, particularly about 0.22, more particularly 0.224×($FeCl_3+NaAlO_2$).

The following examples are put forth as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1—Method of Preparing the Granules

The granules were recovered from excess granular anaerobic sludge from a biomethanization processing plant (Quebec). The sludge was drained from the bioreactor liquid phase to stop the biological activities. The sludge can come from any granular sludge bioreactor, preferentially UASB reactors. Other UASB reactors include paper mill effluent fed, cheese processing plant effluent, or any type of wastewater effluent.

The granules were then conveyed to a conventional air dryer. The temperature of the air generated can reach a temperature comprises between 20° to 60° C., preferably 40° C. The granules were then crushed and sieved to the desired particle diameter size, between about 200 microns to 4 mm. They were then sampled for DNA sequencing. Table 1 lists the bacteria communities found on the dried granules.

The dried bacterial granules can be bagged and stored in order to be used later as seeds or additive components for wastewater treatment systems, in anaerobic as well as aerobic technologies.

Samples of the dried microbial comprising at least about 30% archaea microorganisms in a granular form were submitted to and deposited with the International Depository Authority of Canada (IDAC), 1015 Arlington Street, Winnepeg, Manitoba, R3E 3R2, Canada, were given IDAC number 080217-01.

TABLE 1

Bacteria found in dried anaerobic granules

| Kingdom | Phylum | Class | Order | Family | Genus | % Dried granules |
|---|---|---|---|---|---|---|
| Archaea | Crenarchaeota | Unassigned | Unassigned | Unassigned | Candidatus_Nitrosocaldus | 24.4% |
| Archaea | Euryarchaeota | Methanobacteria | Methanobacteriales | Methanobacteriaceae | Methanobrevibacter | 11.6% |
| Bacteria | Bacteroidetes | Sphingobacteria | Sphingobacteriales | Cytophagaceae | Flexibacter | 5.1% |
| Bacteria | Proteobacteria | Alphaproteobacteria | Caulobacterales | Hyphomonadaceae | Hyphomonas | 4.5% |
| Bacteria | Proteobacteria | Alphaproteobacteria | Sphingomonadales | Sphingomonadaceae | Sphingomonas | 4.5% |
| Bacteria | Firmicutes | Clostridia | Clostridiales | Veillonellaceae | Selenomonas | 3.9% |
| Bacteria | Bacteroidetes | Sphingobacteria | Sphingobacteriales | Chitinophagaceae | Ferruginibacter | 3.3% |
| Bacteria | Proteobacteria | Betaproteobacteria | Burkholderiales | Comamonadaceae | Giesbergeria | 2.3% |
| Bacteria | Proteobacteria | Alphaproteobacteria | Rhizobiales | Brucellaceae | Daeguia | 2.2% |
| Bacteria | Proteobacteria | Alphaproteobacteria | Rhizobiales | Rhizobiaceae | Rhizobium | 1.8% |
| Bacteria | Proteobacteria | Alphaproteobacteria | Rhizobiales | | | 1.7% |
| Bacteria | Bacteroidetes | Bacteroidia | Bacteroidales | Marinilabiaceae | Marinilabilia | 1.5% |
| Bacteria | Proteobacteria | Alphaproteobacteria | Rhodobacterales | Rhodobacteraceae | Thioclava | 1.4% |
| Bacteria | Proteobacteria | Gammaproteobacteria | Pseudomonadales | Moraxellaceae | Alkanindiges | 1.4% |
| Bacteria | Firmicutes | Clostridia | Clostridiales | Veillonellaceae | Mitsuokella | 1.3% |
| Bacteria | Verrucomicrobia | Verrucomicrobiae | Verrucomicrobiales | Verrucomicrobiaceae | Acidimethylosilex | 1.2% |
| Bacteria | Synergistetes | Synergistia | Synergistales | Synergistaceae | Cloacibacillus | 1.2% |
| Bacteria | Verrucomicrobia | Opitutae | Opitutales | Opitutaceae | Alterococcus | 1.2% |
| Bacteria | Proteobacteria | Betaproteobacteria | Burkholderiales | Comamonadaceae | Acidovorax | 1.1% |
| Bacteria | Proteobacteria | Alphaproteobacteria | Rhizobiales | Methylocystaceae | Pleomorphomonas | 1.1% |
| Bacteria | Verrucomicrobia | Opitutae | Opitutales | Opitutaceae | Opitutus | 1.0% |
| Bacteria | Proteobacteria | Alphaproteobacteria | Caulobacterales | Hyphomonadaceae | Hirschia | 1.0% |
| Bacteria | Firmicutes | Clostridia | Clostridiales | Veillonellaceae | Sporomusa | 0.8% |
| Bacteria | Proteobacteria | Alphaproteobacteria | Rhodospirillales | Acetobacteraceae | | 0.8% |
| Bacteria | Firmicutes | Clostridia | Clostridiales | Lachnospiraceae | Acetitomaculum | 0.8% |
| Bacteria | Actinobacteria | Actinobacteria | | | | 0.7% |
| Bacteria | Actinobacteria | Actinobacteria | Actinomycetales | Actinomycetaceae | Actinobaculum | 0.7% |
| Bacteria | Proteobacteria | Gammaproteobacteria | Enterobacteriales | Enterobacteriaceae | Samsonia | 0.6% |
| Bacteria | Bacteroidetes | Bacteroidia | Bacteroidales | Porphyromonadaceae | Proteiniphilum | 0.6% |
| Bacteria | Proteobacteria | Alphaproteobacteria | Sphingomonadales | Erythrobacteraceae | Altererythrobacter | 0.6% |
| Archaea | Euryarchaeota | Methanobacteria | Methanobacteriales | Methanobacteriaceae | Methanobacterium | 0.6% |
| Bacteria | Proteobacteria | Alphaproteobacteria | Sphingomonadales | Sphingomonadaceae | Novosphingobium | 0.6% |
| Bacteria | Bacteroidetes | Flavobacteria | Flavobacteriales | Flavobacteriaceae | Cloacibacterium | 0.6% |
| Bacteria | Proteobacteria | Gammaproteobacteria | Enterobacteriales | Enterobacteriaceae | Salmonella | 0.5% |
| Bacteria | Proteobacteria | Alphaproteobacteria | Rhodobacterales | Rhodobacteraceae | Tranquillimonas | 0.5% |
| Bacteria | Proteobacteria | Betaproteobacteria | Burkholderiales | Comamonadaceae | Comamonas | 0.5% |
| Bacteria | Chloroflexi | Anaerolineae | Anaerolineales | Anaerolinaceae | Levilinea | 0.5% |
| Bacteria | Proteobacteria | Alphaproteobacteria | Rhizobiales | Beijerinckiaceae | Methylocapsa | 0.4% |
| Bacteria | Proteobacteria | Alphaproteobacteria | Rhodospirillales | Rhodospirillaceae | Inquilinus | 0.4% |
| Bacteria | Bacteroidetes | Sphingobacteria | Sphingobacteriales | Chitinophagaceae | Niabella | 0.4% |
| Bacteria | Proteobacteria | Alphaproteobacteria | Rhizobiales | Phyllobacteriaceae | Aminobacter | 0.4% |
| Bacteria | Firmicutes | Clostridia | Clostridiales | Peptostreptococcaceae | Peptostreptococcus | 0.4% |
| Bacteria | Actinobacteria | Actinobacteria | Actinomycetales | Cellulomonadaceae | Actinotalea | 0.4% |
| Bacteria | Bacteroidetes | Flavobacteria | Flavobacteriales | Flavobacteriaceae | Planobacterium | 0.4% |
| Bacteria | Proteobacteria | Alphaproteobacteria | Rhodospirillales | Unassigned | Alysiosphaera | 0.4% |
| Bacteria | Firmicutes | Clostridia | Clostridiales | Clostridiaceae | Acidaminobacter | 0.4% |
| Bacteria | Actinobacteria | Actinobacteria | Actinomycetales | Intrasporangiaceae | Oryzihumus | 0.4% |
| Bacteria | Firmicutes | Bacilli | Bacillales | Planococcaceae | | 0.3% |
| Bacteria | Proteobacteria | Alphaproteobacteria | Rhodobacterales | Rhodobacteraceae | Pseudorhodobacter | 0.3% |
| Bacteria | Proteobacteria | Gammaproteobacteria | Legionellales | Coxiellaceae | Aquicella | 0.3% |
| Bacteria | Actinobacteria | Actinobacteria | Coriobacteriales | Coriobacteriaceae | Collinsella | 0.3% |
| Bacteria | Bacteroidetes | Flavobacteria | Flavobacteriales | Flavobacteriaceae | Elizabethkingia | 0.3% |
| Bacteria | Bacteroidetes | Flavobacteria | Flavobacteriales | Flavobacteriaceae | Amoebinatus | 0.3% |
| Archaea | Euryarchaeota | Methanomicrobia | Methanomicrobiales | Methanomicrobiaceae | Methanosphaerula | 0.3% |
| Bacteria | Proteobacteria | Alphaproteobacteria | Rhodospirillales | Rhodospirillaceae | Rhodovibrio | 0.3% |
| Bacteria | Tenericutes | Mollicutes | Acholeplasmatales | Acholeplasmataceae | Acholeplasma | 0.3% |
| Bacteria | Proteobacteria | Alphaproteobacteria | Rhodospirillales | Acetobacteraceae | Paracraurococcus | 0.3% |

TABLE 1-continued

Bacteria found in dried anaerobic granules

| Kingdom | Phylum | Class | Order | Family | Genus | % Dried granules |
| --- | --- | --- | --- | --- | --- | --- |
| Bacteria | Proteobacteria | Gammaproteobacteria | Enterobacteriales | Enterobacteriaceae | | 0.2% |
| Bacteria | Firmicutes | Bacilli | Bacillales | Paenibacillaceae | Paenibacillus | 0.2% |
| Bacteria | Acidobacteria | Holophagae | Holophagales | Holophagaceae | Geothrix | 0.2% |
| Bacteria | Proteobacteria | Gammaproteobacteria | Xanthomonadales | Xanthomonadaceae | Rhodanobacter | 0.2% |
| Bacteria | Proteobacteria | Alphaproteobacteria | Rhizobiales | Rhizobiaceae | Ensifer | 0.2% |
| Bacteria | Bacteroidetes | Flavobacteria | Flavobacteriales | Flavobacteriaceae | Galbibacter | 0.2% |
| Bacteria | Proteobacteria | Alphaproteobacteria | Rhizobiales | Phyllobacteriaceae | Mesorhizobium | 0.2% |
| Bacteria | Gemmatimonadetes | Gemmatimonadetes | Gemmatimonadales | Gemmatimonadaceae | Gemmatimonas | 0.2% |
| Bacteria | Proteobacteria | Alphaproteobacteria | Sphingomonadales | Erythrobacteraceae | Erythrobacter | 0.2% |
| Bacteria | Actinobacteria | Actinobacteria | Actinomycetales | Microbacteriaceae | Agreia | 0.2% |
| Bacteria | Verrucomicrobia | Verrucomicrobiae | Verrucomicrobiales | Verrucomicrobiaceae | Haloferula | 0.2% |
| Bacteria | Proteobacteria | Gammaproteobacteria | Enterobacteriales | Enterobacteriaceae | Yokenella | 0.2% |
| Bacteria | Bacteroidetes | Flavobacteria | Flavobacteriales | Flavobacteriaceae | Empedobacter | 0.2% |
| Bacteria | Verrucomicrobia | Verrucomicrobiae | Verrucomicrobiales | Verrucomicrobiaceae | Luteolibacter | 0.2% |
| Bacteria | Actinobacteria | Actinobacteria | Actinomycetales | Propionibacteriaceae | Aestuariimicrobium | 0.2% |
| Bacteria | Thermotogae | Thermotogae | Thermotogales | Thermotogaceae | Kosmotoga | 0.2% |
| Bacteria | Proteobacteria | Alphaproteobacteria | Rhodobacterales | Rhodobacteraceae | Rubellimicrobium | 0.2% |
| Bacteria | Proteobacteria | Alphaproteobacteria | Rhodospirillales | Acetobacteraceae | Ameyamaea | 0.2% |
| Bacteria | Proteobacteria | Gammaproteobacteria | Oceanospirillales | Oceanospirillaceae | Pseudospirillum | 0.2% |
| Bacteria | Bacteroidetes | Bacteroidia | Bacteroidales | Bacteroidaceae | Bacteroides | 0.1% |
| Bacteria | Actinobacteria | Actinobacteria | Solirubrobacterales | Conexibacteraceae | Conexibacter | 0.1% |
| Bacteria | Chloroflexi | Chloroflexi | Chloroflexales | Chloroflexaceae | Roseiflexus | 0.1% |
| Bacteria | Proteobacteria | Gammaproteobacteria | Chromatiales | Ectothiorhodospiraceae | Ectothiorhodosinus | 0.1% |
| Bacteria | Proteobacteria | Gammaproteobacteria | Alteromonadales | Alteromonadaceae | Unassigned | 0.1% |
| Bacteria | Firmicutes | Bacilli | Bacillales | Bacillaceae | Tenuibacillus | 0.1% |
| Bacteria | Actinobacteria | Actinobacteria | Actinomycetales | Microbacteriaceae | Humibacter | 0.1% |
| Bacteria | Proteobacteria | Betaproteobacteria | Burkholderiales | Comamonadaceae | Curvibacter | 0.1% |
| Bacteria | Actlnobacteria | Actinobacteria | Actinomycetales | Actinomycetaceae | Actinomyces | 0.1% |

Example 2—Rehydration of Dried Granules

The study of speed and of rehydration rate of dried granules was carried out in two series of trials under different soaking conditions (soaking solution and temperature).

The analysis of the initial dryness (dry matter–MS %) was carried out as soon as the material was received. Two trials of the rehydration rate of the dried granules were carried out under the following conditions:

| Conditions | First trial | Second trial |
| --- | --- | --- |
| Soaking solution | Demineralized water | Synthetic wastewater* |
| Temperature | Ambient (±21° C.) | Mesophile (35 ± 1° C.) |

*The composition of the synthetic wastewater is the one used in the Massalha study (2014)

The methodology used for the rehydration trials is summarized as follows:
- A serie of 12 bottles were prepared in which ±8.0 g of dried granules were soaked with 125 mL of demineralised water or synthetic wastewater according to the trial;
- The bottles were then incubated at the indicated temperature and stirred periodically to promote rehydration of the granules;
- At the end of the allotted soaking time, the granules were drained through a sieve for 6 minutes (±15 s) to remove the soaking solution and then dryness (MS) was measured according to the standardized method.

TABLE 2

Rehydration of dried granules

| | Level of measured dry matter (dryness-%) | |
| --- | --- | --- |
| Rehydration time (h) | Trial 1 (demineralized water-ambient temperature) | Trial 2 (synthetic wastewater-mesophilic temperature) |
| 0 | 88.5 | 88.5 |
| 0.25 | — | 33.8 |
| 0.50 | — | 31.0 |
| 0.75 | — | 30.0 |
| 1 | — | 30.3 |
| 2 | 24.5 | 28.5 |
| 4 | 22.6 | — |
| 6 | 23.0 | 28.0 |
| 24 | 22.1 | 23.2 |
| 32 | 21.5 | — |
| 48 | 24.0 | 22.3 |
| 72 | 22.0 | — |
| 96 | 22.1 | 16.5 |
| 168 | 22.2 | — |
| 360 | 20.3 | — |
| 408 | 20.5 | — |
| 670 | — | 14.7 |
| 1008 | 18.3 | — |
| Dryness of fresh granules | | 11.3% |

Figure 1B:
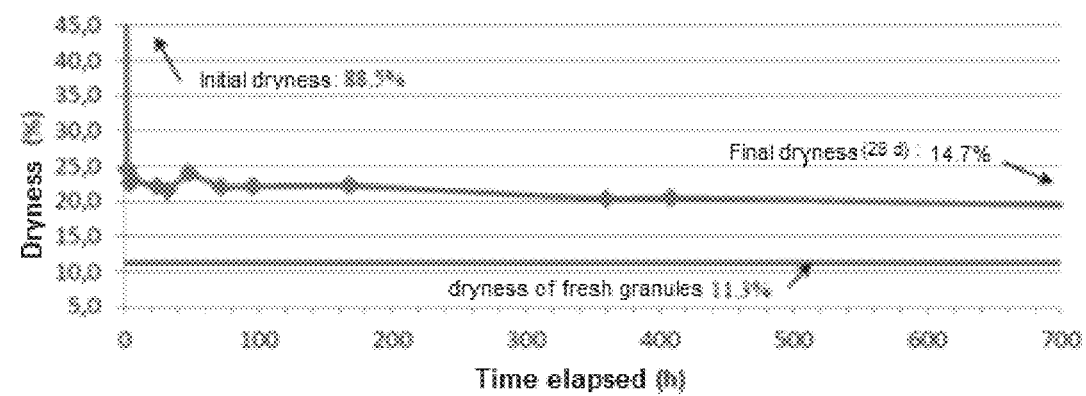
FIG. 1B shows the kinetic of rehydration of the granules in synthetic wastewater in mesophilic conditions FIG. 2. Percentage of methane measured in the biogas at different times during the trials: after 3 days (0 to 3), between 3 and 20 days (3 to 20) and then between 20 and 45 days of methanization (20 to 45) (average value of two trials).
Figure 2:
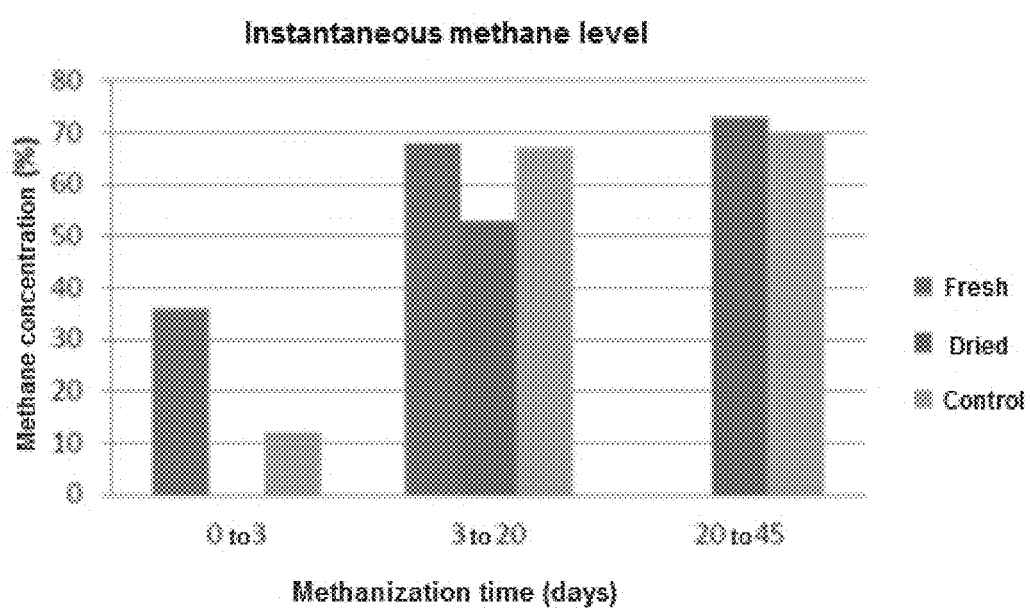
Figure 3:
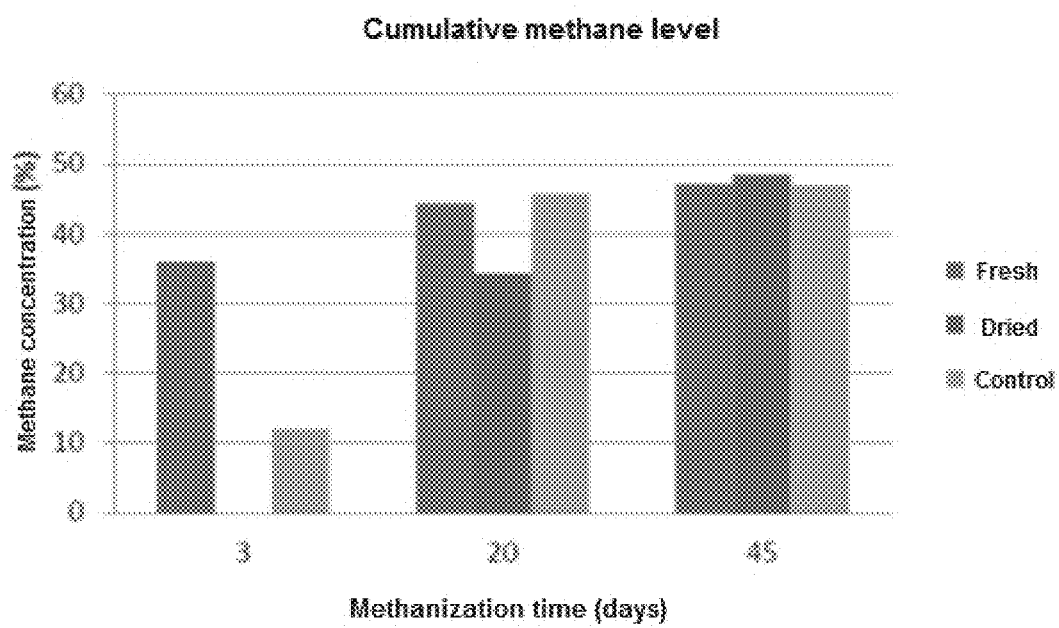
FIG. 3. Percentage of cumulative methane measured in the biogas since the start of the trials: after 3 days, after 20 days and then at the end of the trials, after 45 days of methanization (average value of triplicate).
Figure 4:
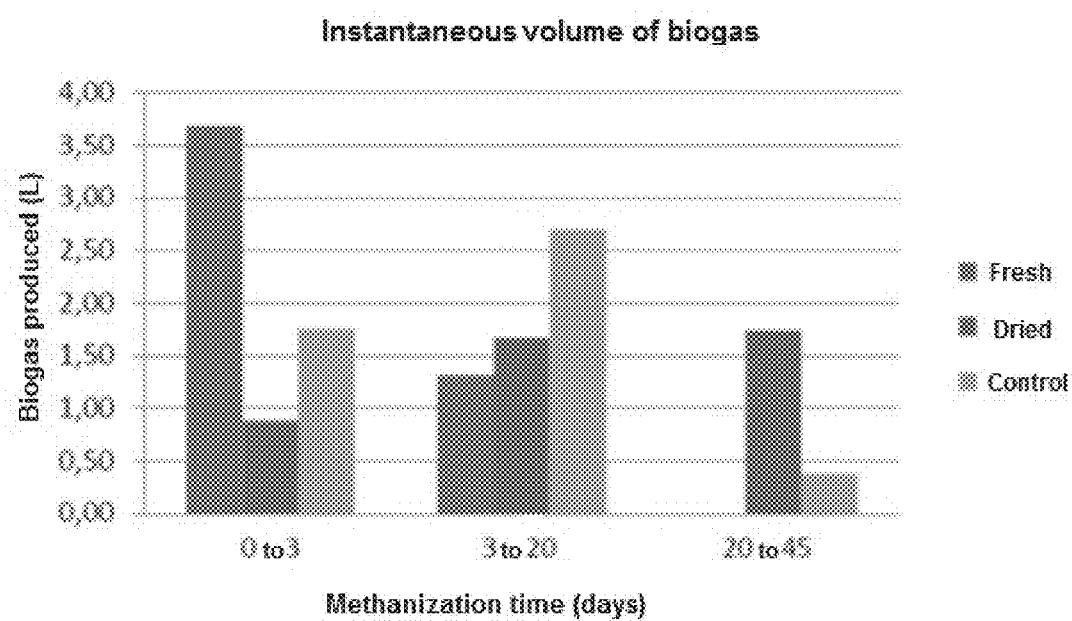
FIG. 4. Volume of biogas produced at different times during the trials: after 3 days, between 3 and 20 days and between 20 and 45 days of methanization (average values of two trials).
Figure 5:
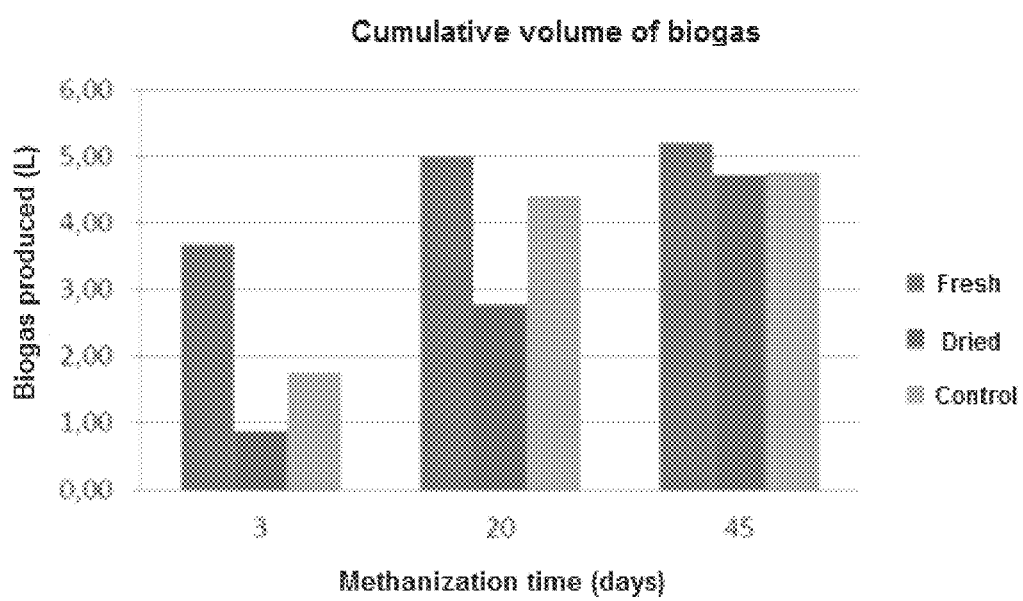
FIG. 5. Volume of cumulative biogas produced since the start of the trials: after 3 days, after 20 days and then at the end of the trials, after 45 days of methanization (average value of triplicate).

As shown in Table 2 and in FIGS. 1A and 1B, partial but important rehydration takes place during the first hours, or even the first minutes, and this then varies less significantly until the end of the trial.

In trial 1, the moisture level of the granules jumped from 11.5% to 75.5% during the first two hours of soaking. This moisture level then continued to increase slightly with relation to the soaking time to reach 81.7% after 42 days of soaking (1008 h).

During trial 2, smaller time intervals were chosen at the start of the trial in order to better evaluate the first minutes of soaking. During the first 15 minutes, the humidity rate rapidly increased from 11.5% to 66.2%. After 2 hours, it was 71.5%, which compares with trial 1. At the end of the trial, after 28 days (670 h), the humidity level reached 85.3%.

There thus appears to be better rehydration of the granules with trial 2. This could be explained by the fact that the synthetic wastewater soaking solution and the mesophilic temperature represent conditions of use more suited to the microbiology of the granulated bacteria, which seem to favor better rehydration of the dried granules.

It is interesting to note that for each of the trials, the final dryness of the dried granules (18.3% and 14.7% for trials 1 and 2 respectively) at no time reached the dryness of the fresh granules (11.3%).

Example 3—Evaluation of the Potential of Dry Granules to Stimulate the Production of Biogas in an Anaerobic Reactor 3.1 Sample and Physicochemical Characterization of the Granules The granule samples were stored under an atmosphere of nitrogen/carbon dioxide, at 35° C. A characterization of MS and MSV (dryness and organic matter) on the 3 types of granules (fresh, dry and control) was also carried out.

3.2 Preparation and Physicochemical Characterization of Synthetic Wastewater

In order to carry out the methanogenic trials, a synthetic wastewater was prepared. This water serves as a substrate for the granules during the trials. It is a substrate rich in carbon (mixture of glucose, yeast extract and peptone) and balanced to microbial nutrient needs (N, P, trace elements such as Ca, Mg, Zn, Cu, Fe, Mn, etc., pH and buffering capacity). The exact composition of the manufactured synthetic wastewater can be consulted in Massalha (2014)[2] by doubling the concentration of the inorganic compounds and multiplying by 5 the concentration of organic compounds (glucose, yeast extract and peptone). The theoretical COD (chemical oxygen demand) of this synthetic water is 10 900 mg/L. Once prepared, the following parameters were characterized to confirm the values:

MS-MSV (dryness and organic matter);
COD (chemical oxygen demand);
NTK (total nitrogen Kjeldahl); and
pH, alkalinity and C/N.

3.3 Methanogenic Potential

The method used is inspired by the methods DIN 38414 TL8 and ASTM D 5511, modified by Angelidaki (2009)[3] and OFEN (2011)[4].

Briefly, a reaction liquor was prepared with the granules to be analyzed and with the synthetic wastewater at a ratio of organic matter (MSV) of the substrate (wastewater) to the organic matter (MSV) of the inoculum (granules) of the order of 1 (S/I ratio=1.0). 700 mL of this liquor was placed in a 1 L bottle and placed in a thermostated bath at 35° C. for 45 days. Biogas produced during this period was accumulated in specially designed gas-tight L sampling bags.

The composition ($CH_4$, $CO_2$ and $H_2S$) of the biogas was analyzed and the volume of biogas produced was measured (volumetric measurement subsequently normalized according to temperature and gauge pressure) three times during the trial: after 3 days, after 20 days and at the end of the trials, after 45 days of methanization.

The analysis was carried out in triplicate and the calculated methanogenic potential corresponds to the average value of the three trials.

TABLE 3

Characterization of granules before use

| Parameter | Fresh granules | Dried granules | Control |
|---|---|---|---|
| Dry matter-MS (%) | 11.29 | 88.49 | 8.19 |
| Organic matter-MSV (% dry base) | 92.12 | 93.17 | 72.87 |
| Chemical oxygen demand—COD (mg/kg humid base)* | 199 090 | 1 283 822 | 68 423 |
| Azote total-NTK (mg/kg humid base)* | 10 260 | 15 167 | 4 961 |
| Ammoniacal nitrogen$NH_4$ (mg N/kg humid base)* | 70.5 | 219.1 | 1 183.2 |
| pH* | 8.65 | — | 8.56 |
| Conductivity (µS/cm)* | 4 260 | — | 11 280 |
| Alkalinity (mg/L $CaCO_3$)* | 2 092 | 3 959 | 8 818 |
| Volatile fatty acid—VFA (mg HAc/L)* | 204 | — | — |

Note: the results for the parameters marked with an "*" are those obtained during the characterization of the first series of trials.

TABLE 4

Characterization of substrate (synthetic water) before use

| Parameter | Synthetic wastewater |
|---|---|
| Dry matter-MS (%) | 1.07% |
| Organic mater-MSV (% dry base) | 95.20% |
| Chemical oxygen demande—COD (mg/kg humid base) | 11 538 |
| Total nitrogen-NTK (mg/kg humid base) | 1 242 |
| pH | 7.92 |
| Alkalinity (mg/L $CaCO_3$) | 6 500 |
| Ratio C/N | 4.9 |

3.4 Volume of Biogas Produced and Composition of Biogas

TABLE 5

Composition of biogas and instantaneous production (average value of duplicates)

| Parameter | Fresh granules | Dried granules | Control |
|---|---|---|---|
| After 3 days of methanization | | | |
| Methane—$CH_4$ (%) | 36 | 0 | 12 |
| Carbon dioxide—$CO_2$ (%) | 46 | 54 | 64 |
| Volume of produced biogas ($cm^3$) (21° C.) | 3 680 | 890 | 1 760 |
| Between the 3rd and the 20th day of methanization | | | |
| Methane—$CH_4$ (%) | 68 | 53 | 67 |
| Carbon dioxid—$CO_2$ (%) | 20 | 34 | 25 |
| Volume of produced biogas ($cm^3$) (21° C.) | 1 320 | 1 670 | 2 700 |
| Between the 20th and 45th day of methanization | | | |
| Methane—$CH_4$ (%) | * | 73 | 70 |
| Carbon dioxide—$CO_2$ (%) | * | 15 | 8 |
| Volume of produced biogas ($cm^3$) (21° C.) | 0 | 1 740 | 380 |

* No gas production during this period: methanization of the substrate is finished.

TABLE 6

Composition and cumulative production of biogas (average value of triplicates)

| Parameter | Fresh granules | Dried granules | Control |
|---|---|---|---|
| After 3 days of methanization | | | |
| Methane—$CH_4$ (%) | 36 | 0 | 12 |
| Carbon dioxide—$CO_2$ (%) | 46 | 54 | 64 |
| Volume of produced biogas ($cm^3$) (21° C.) | 3 680 | 890 | 1 760 |
| Between the 3rd and the 20th day of methanization | | | |
| Methane—$CH_4$ (%) | 44.4 | 34.3 | 45.7 |
| Carbon dioxide—$CO_2$ (%) | 20 | 34 | 41 |
| Volume of produced biogas ($cm^3$) (21° C.) | 5 000 | 2 790 | 4 410 |
| Between the 20th and 45th day of methanization | | | |
| Methane—$CH_4$ (%) | 47.2 | 48.5 | 47.0 |
| Carbon dioxide—$CO_2$ (%) | 36 | 35 | 37 |
| Volume of produced biogas ($cm^3$) (21° C.) | 5 200 | 4 720 | 4 760 |

TABLE 7

Calculated specific methanogenic potential (average of triplicates)

| Trial | Biogas potential | Methanogenic potential |
|---|---|---|
| Fresh granules | 677 $Nm^3$ biogas/t MSV | 320 $Nm^3$ $CH_4$/t MSV |
| Dried granules | 613 $Nm^3$ biogas/t MSV | 297 $Nm^3$ $CH_4$/t MSV |
| Control | 620 $Nm^3$ biogas/t MSV | 292 $Nm^3$ $CH_4$/t MSV |

TABLE 8

Characterization of wastewater at the end of methanization experiments and evaluation of COD removal yield

| Parameter | Fresh Granules | Dried Granules | Control |
|---|---|---|---|
| Dry matter-MS (%) | 0.68 | 0.83 | 0.84 |
| Organic matter-MSV (% dry base) | 13.79 | 23.36 | 30.54 |
| Chemical oxygen demand—COD (mg/kg humid base) | 805 | 3 529 | 4 413 |
| pH | 7.67 | 7.86 | 8.00 |
| Volatile fatty acid—VFA (mg HAc/L)* | 67 | 680 | 64 |
| Performance calculation | | | |
| Removal of COD (%) | 93.0% | 69.4% | 61.8% |

Figure 6:
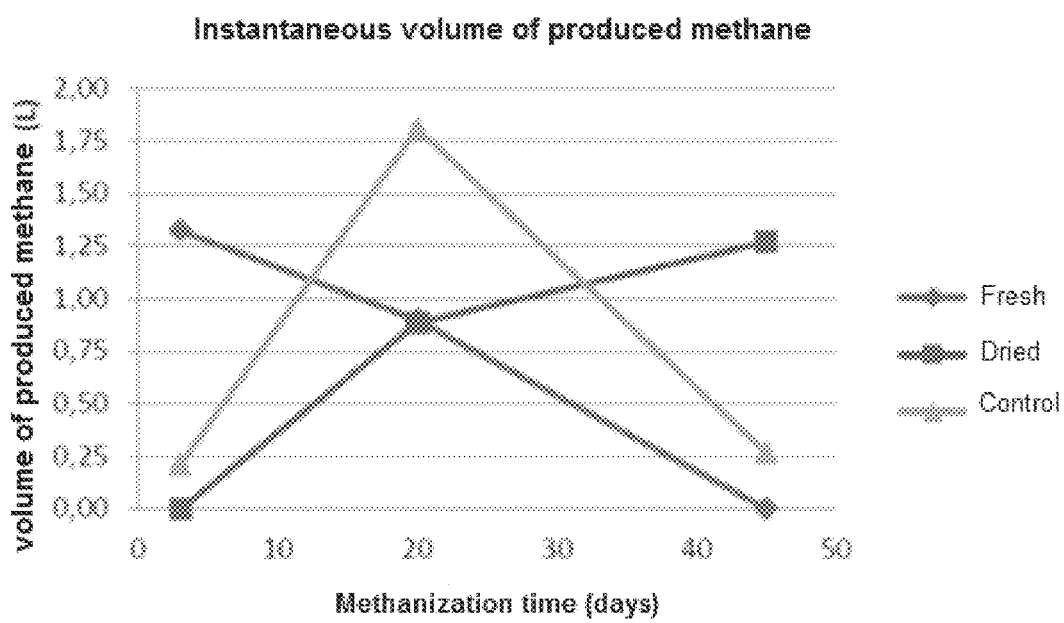
FIG. 6. Quantity of methane produced (by volume) at different times during the trials: after 3 days, between 3 and 20 days and between 20 and 45 days of methanization (average values of two trials).
Figure 7:
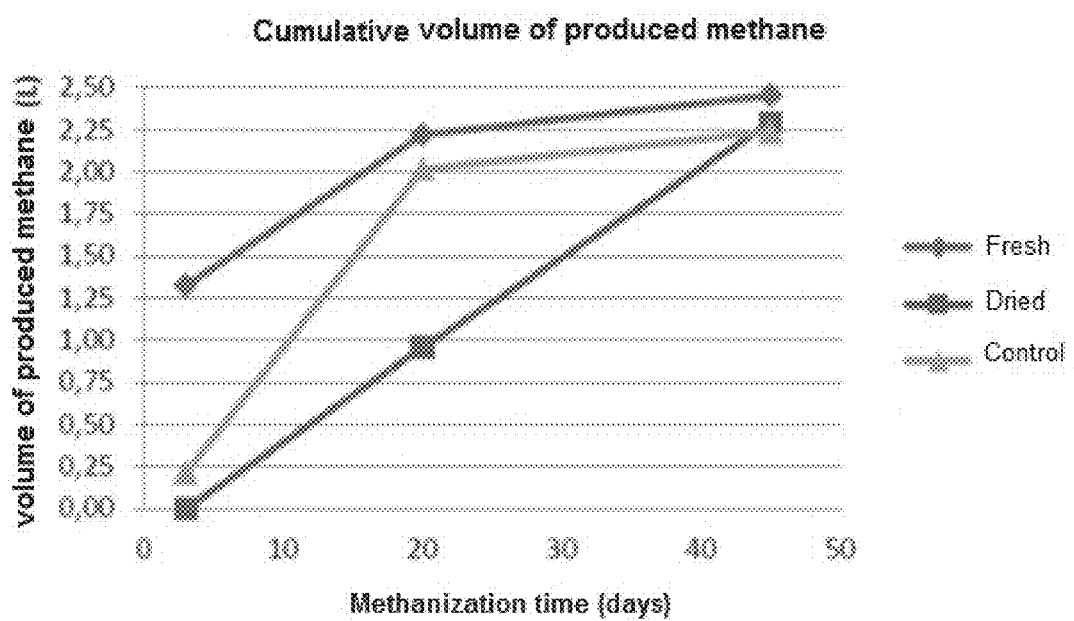
FIG. 7. Cumulative quantity of methane produced (by volume) since the start of the trials: after 3 days, after 20 days and then at the end of the trials, after 45 days of methanization (average value of triplicate).

From Tables 3 to 6 and from FIGS. 2 to 7, it is possible to make the following observations:

a) During the first 3 days of methanization:

The fresh granules produced more than 70% of their cumulative volume of biogas during the first 3 days. More than 1.25 L of methane, or 55% of the total methane was produced during the same period (FIGS. 6 & 7). This corresponds to the highest production period of the fresh granules.

The dried granules produced only about 20% of the cumulative volume of biogas during this period, and this biogas contained no methane yet ($CO_2$ production only).

b) Between the $3^{rd}$ and the $20^{th}$ day of methanization:

The fresh granules produced their last 30% of biogas, and this biogas was very rich in methane (68%). 45% of total methane was produced during this period.

The dried granules produced slightly less than 40% of the total volume of biogas, which had a methane content of 53%. This represents nearly 0.9 L of methane or just over 40% of the total methane produced by these granules (FIG. 7).

c) Between the $20^{th}$ and the $45^{th}$ day of methanization:

There was no production of biogas by the fresh granules during this period. The methanization of the substrate was complete.

The dried granules produced slightly more than 40% of the total volume of biogas, and this had a high methane content, i.e. 73%: more than 1.25 L of methane (FIG. 6), or nearly 60% of the total volume of methane produced by these granules. This corresponds to the highest production period of the dried granules.

The control granules had a profile of production of methane and biogas halfway between these two behaviors (FIG. 6: higher methane production between the $3^{rd}$ and the $20^{th}$ day). Finally, at the $45^{th}$ day, the three types of granules had a very similar total biogas production, both in volume and as a percentage of methane (Table 7 and FIG. 7). The fresh granules obtained the best production.

3.5 Other observations

Our qualitative observations show that the production of biogas started in the first 24 hours with fresh granules (ours and control): an effervescence of biogas bubbles was clearly visible in the bottles, particularly with the fresh granules, which already showed a very strong activity. On the other hand, with the dried granules, the first signs of significant gas production (large release of bubbles) were observed after about a week. On the $10^{th}$ day of methanization, there was significant activity in the bottles containing the dried granules. These observations are in full agreement with our biogas characterization results (Example 3.4).

Bottles containing fresh granules and dried granules on the 10th day of methanization show almost no bubble release in the "fresh" granules bottle (faint presence of foam on surface), which suggests that the methanization of the substrate (synthetic wastewater) is for all intents and purposes already completed in this bottle. On the other hand, in the "dry" granules bottle, there is a strong effervescence that has just begun, after a little more than a week of methanization.

The initiation of methanization with the dried granules is accompanied by a strong black coloration of the reaction liquor. The three bottles of dried granules all became of this color after a dozen days, unlike the fresh and control granules, the supernatant of which remained relatively clear throughout the trials. It appears that the dry granules had not been sieved to remove the fine particles (<200 microns) before carrying out these experiments, which caused the high turbidity of the supernatant.

Our results and observations show that the dried granules take a certain time to activate and begin to produce biogas. With the fresh granules, the production of biogas is fast and intense in the first 3 days. But with the dried granules, it takes ten days before biogas production takes place and this production, both in volume and methane content, comes to its maximum between the 20th and the 45th day of methanization. Despite this latency, or delay compared to fresh granules, there is nevertheless a significant production of biogas and methane, as much as with the control granules and a little less than with the fresh granules. The calculated methanogenic potentials (Table 7) confirm this latter observation.

For COD removal (Table 8), the dried granules appear to be somewhat more effective than the control granules, but less effective than the fresh granules. However, these results should be interpreted with caution since our observations show some degranulation of the control granules, resulting in greater turbidity in the supernatant of the bottle, which in turn has influenced the COD measurement of the treated water. On the other hand, with the dried granules, there was coloration of the water. This black coloration may be due to carbonized or partially carbonized organic matter through the drying process of the granules. This organic matter, whatever it may be, has also surely influenced the measurement of COD in the supernatant.

The trials clearly demonstrate that the drying of the granules and their storage in the presence of oxygen do not irreparably affect the microbial biomass and that it is capable, after rehydration, of stimulating the production of biogas in anaerobic reactor, with an efficiency identical to that of the control granules and with an efficiency almost as good as the fresh granules. However, these dried granules need a latency or acclimatization time of about twenty days to fully recover their metabolic activity.

Example 4—Sludge Volume Index

Table 9 reports the measurements for the SVI (Sludge Volume Index). This parameter indicates the settling characteristics of sludge in activated sludge systems. While conventional activated sludge has a SVI around 130 mL/g, the Nereda® technology has reported an SVI between 50 and 60 mL/g. As can be seen in the last column, the SVI of the present additive with anaerobic granules is 5 to 6 times more effective than the reported Nereda® system.

TABLE 9

Results of MLSS, VSS, SVI30

Results after 72 hours of soaking in wastewater

| Dosage (g/100 mL) | MLSS (mg/L) | MLVSS (mg/L) | SV30 (mL/L) | SVI mL/g) |
|---|---|---|---|---|
| 0.50% | 2925 | 1763 | 23 | 7.9 |
| 1.00% | 4158 | 2028 | 45 | 10.8 |
| 1.85% | 9519 | 6455 | 100 | 10.5 | decantation time: 15 minutes

The granules of the present invention applied to aerobic technologies have the advantage of a better settling speed, which makes it advantageous over regular activated sludge systems. Typically, the settlement speed in a regular activated sludge is 1 meter per hour, while the settlement speeds of our additive can reach 15 20 meters per hour or more compared to 15 for the Nereda® Technology. Settlement after only 15 minutes was observed. Furthermore, the dried granules were resistant to shear testing, as observed by their physical stability after 72 hours of vigorous agitation (150 RPM).

This additive can also be convenient for bioaugmentation purposes in simple non-aerated tanks such as septic tanks. The composition of the additive can be adjusted to allow more flocculating power. The advantage of bridging (flocculate) all suspended mater with the bacteria consortium contained in the anaerobic granules down, is to assure that the bacteria will not leave the wastewater treatment system with the streams unlike simple addition of floating bacteria spores alone. This allows a higher retention time of the bacteria so they can easily digest the sludge along with organic matter presents in the wastewater tank. In this manner, the anaerobic and facultative anaerobic bacteria will thrive in the decomposition of the organic matter into $CO_2$ and $CH_4$ gases.

The inconveniences of the Nereda® Technology come from the fact that the in situ formation of the granules can be long to start. The process involves multiple repetitive steps and depending on the characteristics of the influent wastewater, it can take as long as 4 months to start-up properly.

The dried granules of the present invention have the advantage of quick rehydration and activation in less than 24 hours. Quicker start means less energy, more environmental safety and better economic profile.

This invention is applicable in aerobic activated sludge-type wastewater treatment technologies as well as in fully anaerobic operated systems such as methane production plants.

Example 5—Production of Activated Silica Beads

The activated silica beads are made by mixing dry zeolite with $FeCl_3$ and by slowly adding dry powder of $NaAlO_2$. The reverse is possible. No solutions are involved in the surface modification of the zeolite. Water molecules naturally contained inside the zeolite clusters react with the other molecules to promote ions dissociation, diffusion and neutralization. The micro chemical reactions are exothermic resulting in high temperature rise, more than 57.4 KJ per mole. It is therefore necessary to control the temperature by slowly adding the Sodium Aluminate powder to the mix of zeolite and iron chloride powder.

The composition of the mix is obtained proportionally to the following equations 1 & 2:

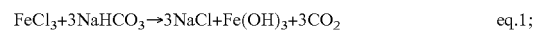
$$FeCl_3 + 3NaHCO_3 \rightarrow 3NaCl + Fe(OH)_3 + 3CO_2 \qquad eq.1;$$

$$NaAlO_2 + CO_2 + 2H_2O \rightarrow NaHCO_3 + Al(OH)_3 \qquad eq.2.$$

One mole of $FeCl_3$ consumes 3 moles of bicarbonate to produce 1 mole of coagulant ($Fe(OH)_3$). The $CO_2$ resulting from the equation 1 reaction is in turn consumed by 3 moles of the sodium aluminate ($NaAlO_2$) to produce 3 more moles of coagulant ($Al(OH)_3$) with 3 more moles of bicarbonates which will fuel the reaction in a continuous cycle. In other terms, the composition of the mix is based on a factor involving 246 g (3 moles) of Sodium Aluminate ($NaAlO_2$) and 162.5 g (1 mole) of ferric chloride ($FeCl_3$) and 91.5 g of clinoptilolite or any type of natural zeolite of any grain size (but preferentially around 40 mesh). This yields a general formula of $NaAlO_2/FeCl_3 = 1.5$ and Zeolite=$0.224 \times (FeCl_3 + NaAlO_2)$.

Example 6—Phosphate Reduction of Wastewater with Activated Silica Beads

Coagulation trials (jar test) were carried out in order to evaluate the performance of two products: activated silicate and dried microbial granules, on two types of wastewater: municipal wastewater (City Rivière-du-Loup, QC) and industrial wastewater after aeroflotation (Cabano, QC).

The coagulation trials were carried out using a Phipps & Bird 6-position flocculation bench model PB-700. The volume of wastewater used for each trial was 500 mL placed in 1000 mL beakers. After decantation, aliquots of supernatant were removed using a tube under the surface of the supernatant for analysis.

The scale of qualification of the aspect of the flocculation used is that proposed in the Technical Memento de l'eau de Degrémont[5] (see Table 10).

TABLE 10

Qualifying scale of the appearance of flocs

| | |
|---|---|
| 0 | No floc |
| 2 | Flocs almost invisible, tiny dots |
| 4 | Small flocs |
| 6 | Average sized flocs |
| 8 | Big flocs |
| 10 | Very big flocs (>1 cm) |

The residual turbidity and pH were measured immediately after the settling period in the supernatant samples taken. The turbidimeter used is the Hach Model 2100P.

The ammoniacal nitrogen was assayed in spectrophotometry by the Nessler method after homogenization of a diluted sample and filtration over 0.45 μm to eliminate the turbidity (Standard Methods for the Examination of Water and Wastewater).

The total phosphorus was analyzed after acid digestion with potassium persulfate. The contents were assayed on the mineralization in spectrophotometry with the method of ascorbic acid (Standard Methods for the Examination of Water and Wastewater).

TABLE 11

Coagulation trials carried out with activated silica on industrial wastewater with optimal conditions of agitation

| | | Results after 30 minutes of settling | | | |
|---|---|---|---|---|---|
| Dosage[1] (mg/L) | Actual Dosage (mg/L) | Floc (qualitative) | Turbidity (UTN) | pH | N—NH$_4$ (mg/L-N) | P$_{tot}$ (mg/L P) |
| 0 Homogeneous sample | — | — | 99 | 7.91 | 4.38 | 1.20 |
| 0 Settled control | 0 | 0 | 88 | 7.89 | 3.75 | 1.25 |
| 100 | 89.2 | 2 | 39 | 7.91 | 3.63 | 0.45 |
| 200 | 202.0 | 2 | 35 | 7.97 | 3.55 | 0.23 |
| 400 | 410.0 | 2 | 25 | 7.96 | 3.33 | 0.20 |
| 600 | 614.4 | 4 | 20 | 7.95 | 3.23 | 0.15 |
| 800 | 810.6 | 4 | 15 | 7.94 | 3.13 | 0.18 |
| 1 000 | 1 013.8 | 4 | 9 | 7.96 | 3.08 | 0.13 |
| 1 200 | 1 213.2 | 4 | 9 | 7.96 | 3.15 | 0.15 |

[1]Dosages made with addition of activated silica powder for all dosages.
Production conditions:
Fast mixing (150 rpm): 2 minutes
Slow mix (40 rpm): 15 minutes
Decantation (0 rpm): 30 minutes From Table 11, one can see that:

a) ammoniacal nitrogen decreases from 4.38 to 3.15, b) phosphate decreases from 1.20 to 0.15, while c) the alcalinity (pH) remains stable at 7.91-7.96 but does not move to the acid side.

It is this stable alkalinity provided by the activated silica beads that brings an advantage for the microbial granules when added to treat COD.

Example 7—Mixture of Bacterial Granules and Activated Silica for Wastewater Treatment

TABLE 12

Coagulation experiment with mixture of activated silica beads + bacterial granules (100 to 400 mg/L) in industrial wastewater.

| | | Results after 30 minutes of settling | | | | |
|---|---|---|---|---|---|---|
| Dosage[1] (mg/L) | Actual Dosage (mg/L) | Floc (qualitative) | Turbidity (UTN) | pH | N—NH$_4$ (mg/L-N) | P$_{tot}$ (mg/L P) |
| 0 Homogeneous sample | — | — | 52 | 7.66 | 3.63 | 2.28 |
| 0 Settled control | 0 | 0 | 50 | 7.68 | 3.13 | 2.20 |
| 100 | 117.4 | 2 | 42 | 7.69 | 3.13 | 1.61 |
| 200 | 218.0 | 2 | 39 | 7.72 | 3.25 | 1.44 |
| 400 | 400.8 | 4 | 31 | 7.78 | 3.25 | 0.96 |
| 600 | 616.2 | 4 | 22 | 7.96 | —[2] | 0.57 |
| 800 | 815.0 | 4 | 20 | 7.96 | 2.88 | 0.51 |
| 1 000 | 1 016.0 | 4 | 17 | 7.97 | 3.13 | 0.47 |
| 1 200 | 1 205.0 | 4 | 18 | 7.95 | 3.13 | 0.46 |

[1]Dosages achieved with the addition of microbial granules and activated silica powder for all dosages.
[2]Result rejected.
Production conditions:
Fast mixing (200 rpm): 2 minutes
Slow mix (40 rpm): 15 minutes
Decantation (0 rpm): 30 minutes From Table 12, one can see that a) ammoniacal nitrogen decreases (from 3.63 to 3.13), b) phosphate decreases (from 2.28 to 0.46), while c) the pH remains higher than 7 showing sufficient alkalinity to allow optimal miocrobial activity.

Using the scale described in Table 10, formation of small flocs was observed with a dosage of 400 mg/L of granules in industrial wastewater However, in the absence of granules, making it possible to observe the natural color and turbidity of the wastewater, no flocs and sludge accumulation were apparent.

This product mixture allows a coagulation action and phosphate removal without consuming the water alkalinity. This allows for simultaneous coagulation and phosphate reduction while maintaining the alkalinity for maintaining microbial activity of the granules presented in Examples 1 to 4.

Example 8—Activity Measurements of the Granules (100%) in SBR-Like Reactor with Oxygen Saturated Environment In short, 1% of granules were soaked (15 g in 1500 mL) in synthetic wastewater (Massalha, 2014) for 40 hours under aerated agitation. In a conventional sequence of: Iddle, Fill, React, Settle and Draw, the granules were allowed to settle for an hour and 1000 mL of supernatant was drawn (⅔ of reactor's volume). After 24 hours iddle time, 1000 mL of fresh synthetic wastewater was then added, and a fresh aliquot was immediately sampled for analysis at time ($t_0$). Once a day, a cycle of Iddle, Fill, React, Settle and draw, under aeration and agitation, was carried out (in duplicates for 2 reaction times of: 2 h and 4 h) for a total of 3 cycles.

The same protocol was reproduced for the 2$^{nd}$ and 3$^{rd}$ cycle each day. Table 13 shows the results obtained from these 3 cycles, whereas Table 14 shows the interpretation of the COD consumption from Table 13.

TABLE 13

| | Dosage (g/100 mL) | MES (mg/L) | MVES (mg/L) | COD (mg/L) | NTK (mg/L N) | N—NH$_3$ (mg/L N) | P$_{tot}$ (mg/L P) | o-PO$_4$ (mg/L P) |
|---|---|---|---|---|---|---|---|---|
| | Synthetic wastewater | | | 2079 | 383 | 330 | 151 | 155 |
| | Supernatant (t$_0$) | | | 2035 | 375 | 307 | | 143 |
| 1st cycle | Reaction 2.5 h | 146 | 132 | 1752 | 353 | 306 | | 140 |
| | Reaction 4 h | 192 | 168 | 1456 | | 295 | | 132 |
| 2nd cycle | Reaction 2 h | 120 | 116 | 1756 | | 318 | | 126 |
| | Reaction 3.5 h | 320 | 284 | 1384 | | 310 | | 136 |
| 3rd cycle | Reaction 2 h | 120 | 94 | 1728 | | | | |
| | Reaction 4 h | 118 | 80 | 1496 | | | | |

TABLE 14

Calculation of granules' aerobic activity

| | COD remaining after 2 h (ppm) | COD remaining after 4 h (ppm) | Total COD mass (mg) in 4.5 liters after 2 h | Total COD mass (mg) in 4.5 liters after 4 h | Total COD mass (mg) in 4.5 liters after 4 h |
|---|---|---|---|---|---|
| 1st cycle | 1752 | 1456 | | | |
| 2nd cycle | 1756 | 1384 | | | |
| 3rd cycle | 1728 | 1496 | | | |
| Mean | 1745 | 1445 | 7854 | 6504 | 9356 |
| COD consumption (mg) by the granules | 1502 | 2852 | | | |
| COD consumption (mg) by the granules per hour | 751 | 713 | | | |
| Average COD consumption per hour (mg) | 732 | | | | |
| Daily COD consumption (mg) | 17564 | | | 15g of granules were used | |

In the simulated SBR (Sequential Batch Reactor) with a saturated oxygen environment, the granules showed 17.6 g COD consumption for 15 g of granules per day. Denoting an activity averaging 1.2 unit of COD per unit of granules per day. For example: 1 Lb of Archaea granules spends 1.2 Lbs of COD per Day in an oxygen saturated environment.

CONCLUSION

This is the first time that UASB technology is used mainly for the production of microbial granules. From a synthetic carbon source, the granules' microorganisms feed on this source of carbon whether in an aerobic or an anaerobic environment and multiply at a rate of about 10% of the consumed COD. The particular granules of the present invention (IDAC number 080217-01) constitute the original inoculant with a VSS substrate to inoculum (S/I) ratio of 1.

Hence, the production process for these granules is carried out continuously with a hydraulic retention time of less than 20 days, a controlled carbon source at a mesophilic temperature and a minimal alkalinity level of 250 ppm.

The granules are reproducible and the resulting consortium corresponds substantially to the profile as defined in Table 1, particularly in anaerobic mode.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

All publications and patent applications cited in this specification are herein incorporated by reference as if each individual publication or patent application were specifically and individually indicated to be incorporated by reference.

REFERENCES

1—Nereda system: 201504 Connect magazine Nereda; or 201506 Water 21, April Nereda update; or 201506 SAICE Civil Engineering Magazine Nereda update.
2—Massalha, N. et al. (2014). The effect of anaerobic biomass drying and exposure to air on their recovery and evolution. Water Research 63.
3—Angelidaki, I. et al. (2009). Defining the biomethane potential (BMP) of solid organic wastes and energy crops: a proposed protocol for batch assays. Water Science & Technology-WST. 59.5.
4—Office fédéral de l'énergie (OFEN) (2011). Optimisation des tests standardisés de digestibilité dans des réacteurs batch. Rapport final, Département fédéral de l'environnement et de l'énergie, Confédération Suisse.
5—Degrémont (2005), Memento technique de l'eau, 10th ed., Rueil-Malmaison.
U.S. Pat. No. 6,793,822.
WO2011/106848.

The invention claimed is:

1. A process for aerobically treating wastewater comprising the steps of:
  a) contacting a composition comprising air-dried anaerobic sludge granules with a wastewater having an original chemical oxygen demand (COD) to form a wastewater: granules mixture, wherein the granules comprise a mixture of anaerobic bacteria, facultative anaerobic bacteria, and anaerobic and facultative anaerobic archaea microorganisms, wherein at least 30% dried granules are the archaea microorganisms, and wherein the archaea microorganisms comprise a species from the genera Candidatus Nitrosocaldus and Methanobrevibacter;
  b) incubating the mixture to achieve at least a 50% decrease of the original COD to obtain a treated wastewater, wherein said incubating is carried out with the introduction of an oxygen-containing gas; and;
  c) separating said granules from said treated wastewater.
2. The process of claim 1, wherein said step b) is carried out until COD is reduced by at least 60%.
3. The process of claim 1, wherein said step b) is carried out until COD is reduced by at least 70%.
4. The process of claim 1, carried out at a temperature between 10 to 50° C.
5. The process of claim 1, wherein said granules are air-dried to a temperature between 20° C. and 60° C.
6. The process of claim 1, wherein said at least 32% of the dried granules are the archaea microorganisms.

7. The process of claim 1, wherein said at least 36% of the dried granules are the *archaea* microorganisms.

8. The process of claim 1, wherein said granules have a size between 200 microns and 4 mm.

* * * * *